(12) United States Patent
Beaurepaire

(10) Patent No.: US 10,904,705 B2
(45) Date of Patent: Jan. 26, 2021

(54) METHOD AND APPARATUS FOR RECOMMENDING MOBILITY SERVICE OPERATORS BASED ON USER MOBILITY PATTERNS

(71) Applicant: HERE GLOBAL B.V., Eindhoven (NL)

(72) Inventor: Jerome Beaurepaire, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/362,278

(22) Filed: Mar. 22, 2019

(65) Prior Publication Data

US 2020/0304951 A1    Sep. 24, 2020

(51) Int. Cl.
*H04W 4/029* (2018.01)
*H04W 4/02* (2018.01)
*H04W 4/42* (2018.01)

(52) U.S. Cl.
CPC .......... *H04W 4/029* (2018.02); *H04W 4/023* (2013.01); *H04W 4/42* (2018.02)

(58) Field of Classification Search
CPC ........ H04W 4/029; H04W 4/42; H04W 4/023
See application file for complete search history.

(56) References Cited

U.S. PATENT DOCUMENTS

| | | | |
|---|---|---|---|
| 9,247,014 B1 | 1/2016 | Rao | |
| 2008/0189226 A1 | 8/2008 | Wurster | |
| 2013/0054375 A1 | 2/2013 | Sy et al. | |
| 2017/0200249 A1* | 7/2017 | Ullrich | G06Q 50/30 |
| 2018/0268039 A1 | 9/2018 | Gusenbauer et al. | |
| 2019/0311417 A1* | 10/2019 | Randisi | H04W 4/23 |
| 2020/0020029 A1* | 1/2020 | Yuza | G07C 5/008 |
| 2020/0126000 A1* | 4/2020 | Kim | G06Q 50/30 |

* cited by examiner

*Primary Examiner* — Mohamed Barakat
(74) *Attorney, Agent, or Firm* — Ditthavong & Steiner, P.C

(57) ABSTRACT

An approach is provided for providing an automated recommendation of mobility service providers (e.g., based on a user mobility pattern). The approach involves aggregating mobility service data from a plurality of candidate mobility service providers, wherein the plurality of candidate mobility service providers provide shared vehicle services. The approach further involves selecting at least one recommended mobility service provider from the plurality of candidate mobility service providers based on the mobility pattern and the mobility service data. The approach further involves presenting a recommendation for the user to register for the at least one recommended mobility service provider in a user interface.

19 Claims, 12 Drawing Sheets

METHOD AND APPARATUS FOR RECOMMENDING MOBILITY SERVICE OPERATORS BASED ON USER MOBILITY PATTERNS

BACKGROUND

Providing navigation support to users is an important function for map service providers. Current navigation systems can provide route guidance to and from any accessible address, location, coordinate pair, etc. such as a home, an office, a restaurant, a sporting or cultural venue, a shopping mall, etc. via various means or modes of transportation (e.g., private transportation, public transportation, walking, etc.). However, such systems are often restricted by the constraints of a static public transport network, the issue of having to find parking at the destination, etc. Vehicle sharing services (e.g., shared cars, shared bicycles, shared scooters, etc.) can alternatively offer users flexibility in where they can pick up and drop off shared vehicles without the burden of vehicle ownership. However, when faced with a high number of shared vehicle or mobility service providers in a given area (e.g., a city center), users can easily become challenged to know which one(s) are the most suitable for their needs without having to go through the time and effort of registering with all the various service providers.

SOME EXAMPLE EMBODIMENTS

Therefore, there is a need for recommending shared vehicle or mobility service providers based on a user's mobility patterns.

According to one embodiment, a computer-implemented method for providing an automated recommendation of mobility service providers comprises determining a mobility pattern associated with a user. The method also comprises aggregating mobility service data from a plurality of candidate mobility service providers, wherein the plurality of candidate mobility service providers provide shared vehicle services. The method further comprises selecting at least one recommended mobility service provider from the plurality of candidate mobility service providers based on the mobility pattern and the mobility service data. The method further comprises presenting a recommendation for the user to register for the at least one recommended mobility service provider in a user interface.

According to another embodiment, an apparatus for providing an automated recommendation of mobility service providers comprises at least one processor, and at least one memory including computer program code for one or more computer programs, the at least one memory and the computer program code configured to, with the at least one processor, cause, at least in part, the apparatus to determine a mobility pattern, a user preference, a user constraint, or a combination thereof associated with a user. The apparatus is also caused to aggregate mobility service data from a plurality of candidate mobility service providers, wherein the plurality of candidate mobility service providers provide shared vehicle services. The apparatus is further caused to select at least one recommended mobility service provider from the plurality of candidate mobility service providers based on the mobility pattern, the user preference, the user constraint, or the combination thereof and the mobility service data. The apparatus is further caused to present a recommendation for the user to register for the at least one recommended mobility service provider in a user interface.

According to another embodiment, a non-transitory computer-readable storage medium for providing an automated recommendation of mobility service providers carries one or more sequences of one or more instructions which, when executed by one or more processors, cause, at least in part, an apparatus to determine a mobility pattern associated with a user. The apparatus is also caused to aggregate mobility service data from a plurality of candidate mobility service providers, wherein the plurality of candidate mobility service providers provide shared vehicle services. The apparatus is further caused to select at least one recommended mobility service provider from the plurality of candidate mobility service providers based on the mobility pattern and the mobility service data. The apparatus is further caused to present a recommendation for the user to register for the at least one recommended mobility service provider in a user interface.

According to another embodiment, an apparatus for providing an automated recommendation of mobility service providers comprises means for determining a mobility pattern associated with a user. The apparatus also comprises means for aggregating mobility service data from a plurality of candidate mobility service providers, wherein the plurality of candidate mobility service providers provide shared vehicle services. The apparatus further comprises means for selecting at least one recommended mobility service provider from the plurality of candidate mobility service providers based on the mobility pattern and the mobility service data. The apparatus further comprises means for presenting a recommendation for the user to register for the at least one recommended mobility service provider in a user interface.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing an automated recommendation of mobility service providers are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
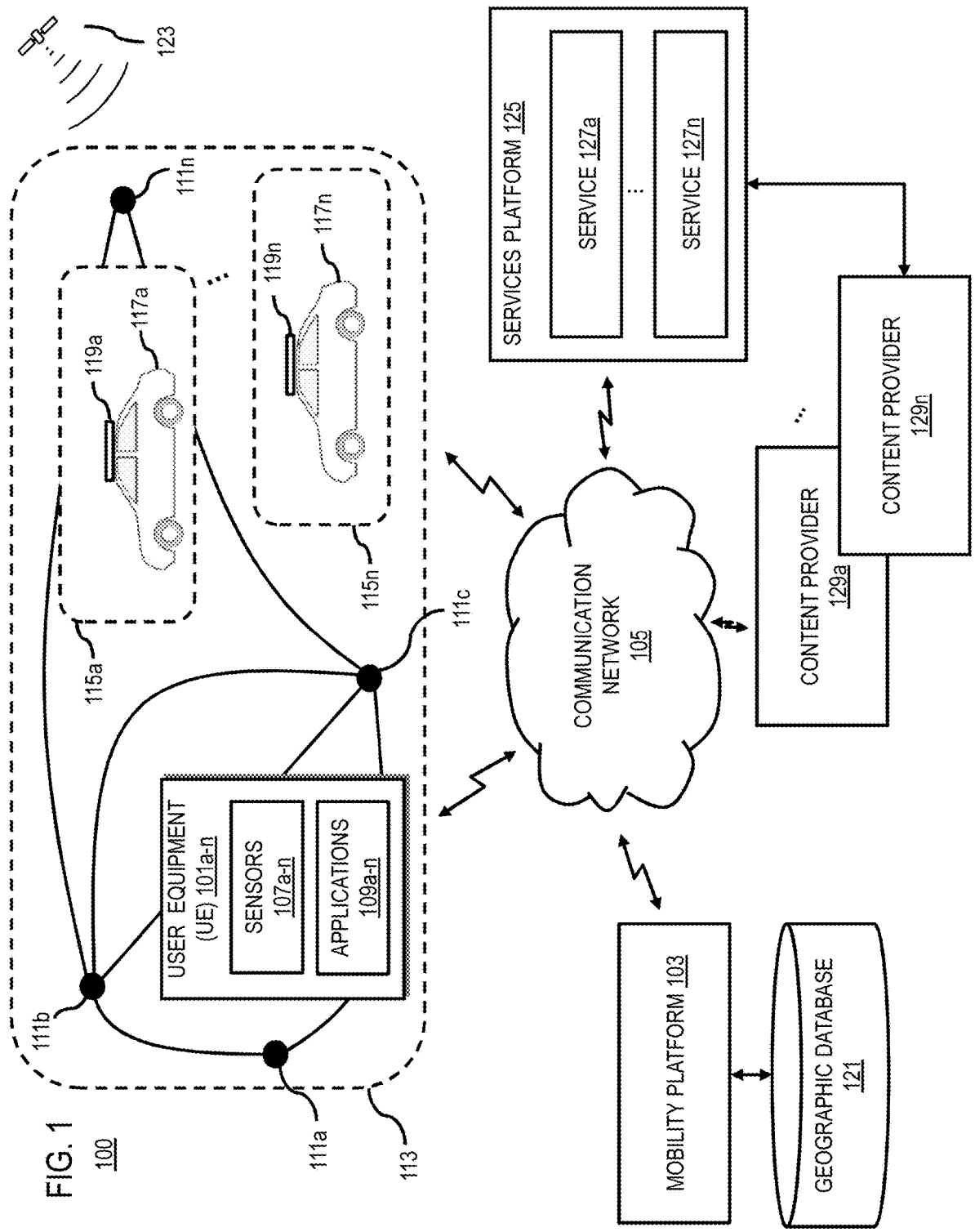
FIG. 1 is a diagram of a system capable of providing an automated recommendation of mobility service providers, according to one embodiment.

FIG. 1 is a diagram of a system capable of providing an automated recommendation of mobility service providers, according to one embodiment. As described above, navigation systems can provide route guidance to and from any accessible, drivable, etc. address, location, coordinate pair, etc. (even a road link ID+offset along that link) such as a home, an office, a restaurant, a sporting or cultural venue, a shopping mall, a bus stop, a taxi station, a shared vehicle drop off pickup station, etc. via various means or mode of transportation. In some instances, the address or location may be a place of interest (POI) (i.e., a place that is interesting to the general public); however, in other instances the address or location may be private (i.e., a personal POI such as a home). By way of example, when a user requests a navigation route to a restaurant, for example, a navigation routing engine can identify all available transportation options. However, such systems are often restricted by the constraints of a static public transportation network. For example, a user may not live near a public transportation station or hub (e.g., a bus or a train station). Similarly, a posted departure or arrival time may not coincide with the user's intended arrival or departure time at or from the given address or location, respectively.

Multimodal or intermodal routes can provide some flexibility with regards to navigation by combining multiple different modes of transportation (e.g., private vehicle, shared vehicle, public transportation, etc.) to provide a best (e.g., fastest time, shortest distance, etc.) navigation route to a given address or location (e.g., a drivable location). For example, when a user requests an intermodal route from a navigation system, a navigation routing engine can identify all available transportation options and select the best options to destination. However, this computed route is only best with respect to information available to the routing engine at the time that the routing engine computed the route. This limited information can be problematic particularly with respect to using or evaluating the use of shared vehicles (e.g., cars, scooters, bicycles, etc.) as a transportation option for at least one segment of the computed route.

Vehicle sharing or mobility services are increasingly becoming popular alternatives to public transportation in many areas due to the advantages that they can provide users in terms of where they can pick up and drop off shared vehicles, the high costs associated with fulltime vehicle ownership, etc. Consequently, various mobility service providers are entering such areas and markets to capitalize on this trend. For example, some cities or areas contain thousands of shared vehicles that are owned and/or operator by different mobility operators. However, when faced with multiple options, users are likely to have a difficult time knowing which one(s) are the most suitable for their needs without having to register with all the providers, which can be time consuming, frustrating, and can in instances consume considerable memory on a user device (e.g., a mobile device or a smartphone). For example, different operators may have different specific operating areas and services. As such, the operating area of one service provider may include a user's work location, but not her/his home location or vice-versa. Therefore, if the user selected one of the shared vehicles (e.g., a shared car) associated with that mobility service provider and then traveled from work to home or vice versa, the user is likely to incur additional costs (e.g., a parking penalty) or the user may have to spend additional time finding parking within the operator's service area. In some instances, the user may even have to take additional transportation (e.g., to avoid parking penalties), negating the potential flexibility and advantages of shared vehicles.

To address these technical problems, a system 100 of FIG. 1 introduces a capability to provide an automated recommendation of mobility service providers, according to one embodiment. In one embodiment, the system 100 of FIG. 1 may include one or more user equipment (UE) 101a-101n (also collectively referred to herein as UEs 101) (e.g., a mobile device, a smartphone, etc.) associated with a user having connectivity to a mobility platform 103 via a communication network 105. In one embodiment, the UEs 101 include one or more device sensors 107a-107n (also collectively referred to herein as device sensors 107) (e.g., GPS sensors) and one or more applications 109a-109n (also collectively referred to applications 109) (e.g., a shared vehicle booking or reservation application).

In one embodiment, the system 100 learns a user's traveling patterns (i.e., insights about the user) based on the user's mobility patterns or movement over time among one or more locations 111a-111n (also collectively referred to as locations 111) within an area 113. By way of example, the locations 111 may include a user's home, work, a friend's home, etc. In one embodiment, the system 100 can further determine a user's traveling patterns based on a user's preferences (e.g., shared bike versus shared scooter, brand A versus brand B, etc.), a user's constraints (e.g., time, appointments, etc.), or a combination thereof. In one embodiment, the system 100 learns a user's mobility patterns, preferences, and/or constraints by collecting location sensor data (e.g., GPS sensor 107 data) associated with the user's movements within the area 113. In one embodiment, the system 100 learns the mobility graph of the user based on track recording, location detection and clustering, route learning, etc. In other words, the system 100 can learn where a user is more likely to be at a time of day (e.g., within or without the area 113) as well as her/his preferred mode of transportation (e.g., shared car, bike, scooter, etc.) at that location, time, etc. In some instances, the system 100 may also learn one or more preferred alternative modes of transportation (e.g., based on a change of weather or more contextual parameters). In one embodiment, it is contemplated that the system 100 would only collect and use data which is permitted by law or regulation or data that a user has consented to have collected (e.g., via an application 109).

In one embodiment, the system 100 collects and/or aggregates data about one or more mobility operators or providers 115a-115n (also collectively referred to herein as mobility operators 115) (e.g., company A through N) that operate at least within a portion of the area 113 to generate personalized insights for a given user. In one instance, the mobility operators 115 own and/or operate vehicles 117a-117n (also collectively referred to herein as vehicles 117). In one embodiment, the vehicles 117 are shared vehicles (e.g., shared cars, shared bikes, shared scooters, shared rollers, etc.) having connectivity to the mobility platform 103 via the communication network 105. In one instance, the shared vehicles 117 are autonomous or semi-autonomous transport vehicles that can sense their environments and navigate without driver or occupant input via one or more vehicle sensors 119a-119n (also collectively referred to herein as vehicle sensors 119). In one embodiment, the mobility providers 115 may include one or more public transport providers and the vehicles 117 may include "classic" public transport means such as bus, train, metro, subway, tram systems. Although the vehicles 117 are depicted as automobiles, it is contemplated that the vehicles 117 may be any type of public or shared transportation (e.g., a car, a truck, a motorcycle, a bicycle, a scooter, a bus, a train, a metro, a subway, a tram, etc.).

In one instance, the system 100 collects data about the mobility operators 115 including operating areas (e.g., all or a portion of the area 113); pricing models; number of vehicles 117, vehicle distribution over time (e.g., within the area 113); booking events (e.g., check-in and check-out of each vehicle to compute area trends and availability models; and service constraints (e.g., reservations, parking, etc.). In one instance, the pricing models may include monthly/annual subscription services of a public transport system (e.g., bus or metro) as well as pricing models of the one or more shared vehicle operators 115. By way of example, the vehicle distribution over time may represent the historical availability of desired vehicles 117 at the times and locations the user needs them to make sure that there are vehicles when the user needs them (e.g., when a user normally leaves work to return home). In one embodiment, the system 100 learns a user's mobility patterns, preferences, and constraints and collects and/or aggregates data about the mobility operators 117 based on information or data (e.g., historical data and/or real-time information) stored in or accessible via the geographic database 121. In one instance, the system 100 can collect and/or aggregate the mobility operators 115 data based on a user inquiry (e.g., via a shared vehicle reservation or booking application 109). In other instance, the system 100 can collect and/or aggregate the mobility operators 115 data based on one or more new mobility operators 115 (e.g., shared vehicle services) entering the area 113 and/or one or more similar triggering events.

In one embodiment, the system 100 combines data about all the shared vehicle operators (e.g., mobility operators 115) and the user's mobility patterns and preferences to match the user's mobility patterns (e.g., within the area 113) with the most suitable combination of mobility operators. In one instance, the system 100 recommends that the user register with a combination of shared vehicle operator(s). It is contemplated that the suggestions or recommendations by the system 100 should also be careful not to reveal any confidential information/patterns about a given user. By way of example, the system 100 can produce an example output that reads: "Your travel patterns have been analyzed over the last few months and based on the areas that you have traveled, the average time between your appointments, and a few other parameters, it is recommended that you register with e-bike company A and e-scooter company B. This will allow you to reach 93% of your common destinations, reduce your average travel time by 25%, and only cost you an additional $12." By way of example, the one or more other parameters may include access to a temporary discount (e.g., a student discount or a one-time promotional discount), a preference against using shared vehicles operated by a company based on reviews, a low rating (e.g., <3 stars), or any other parameter than differentiates the mobility patterns of at least two users. In one embodiment, the system 100 can recommend the shared vehicle operators to the user via a ranked order (e.g., via a location-based application 109). In one instance, the recommendation of the system 100 may include a comparison of the shared vehicle operators with one or more public transport systems (e.g., bus, train, metro, etc.) so that a user can compare the effectiveness of shared vehicles with public transport. In one embodiment, the user may register with the recommended combination of mobility operators separately (e.g., through each mobility operator's platform) or in some instances, the user may be able to register with the recommend combination of operators through a registration aggregator (e.g., via an application 109).

In one embodiment, the system 100 monitors the evolution of the user's mobility patterns (e.g., via a GPS sensor 107) and the data associated with mobility operators (e.g., mobility operators 115) over time to make further recommendations as the user's needs and/or mobility patterns evolve but also as the landscape of shared vehicle or mobility operators changes. For example, at one time, a user may prefer the convenience of a shared scooter (e.g., when they are young and/or single), but later or at another time, the user may prefer the convenience of a shared car or van (e.g., when they are older or have a family). In another example, one or more mobility operators 115 may have entered or left the area of interest (e.g., area 113), increased or decreased service coverage, increased or decreased in user popularity (e.g., based on user reviews or comments), etc. Consequently, a user can know or learn the most suitable combination of mobility operators based on her/his needs without having to register with each operator, thereby saving the user time, money, energy, etc.

Figure 2:
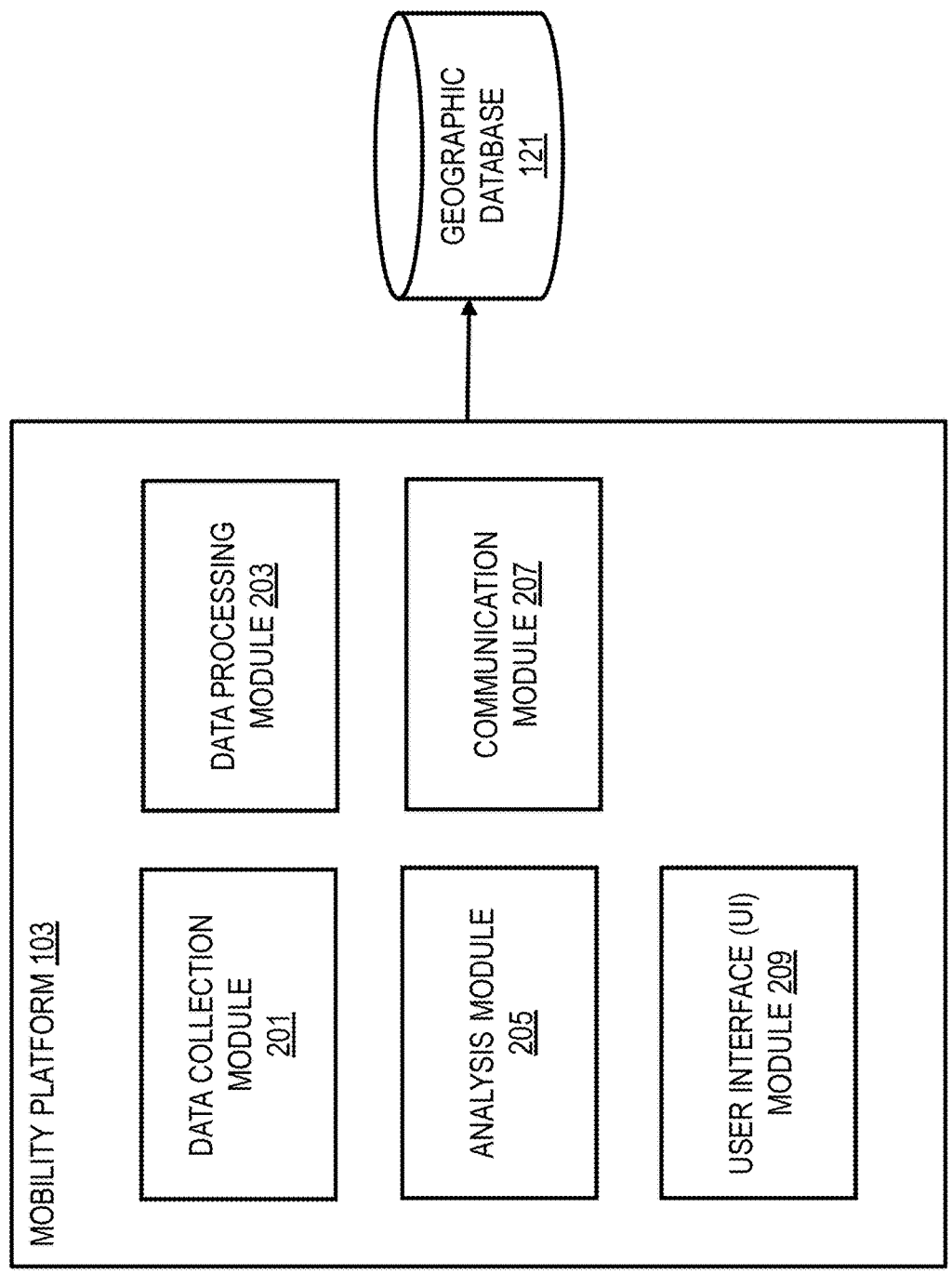
FIG. 2 is a diagram of the components of a mobility platform, according to one embodiment.

FIG. 2 is a diagram of the components of the mobility platform 103, according to one embodiment. By way of example, the mobility platform 103 includes one or more components for providing an automated recommendation of mobility service providers. It is contemplated that the functions of these components may be combined in one or more components or performed by other components of equivalent functionality. In one embodiment, the mobility platform 103 includes a data collection module 201, a data processing module 203, an analysis module 205, a communication module 207, and a user interface (UI) module 209, with connectivity to the geographic database 121. The above presented modules and components of the mobility platform 103 can be implemented in hardware, firmware, software, or a combination thereof. Though depicted as separate entities in FIG. 1, it is contemplated that the mobility platform 103 may be implemented as a module of any of the components of the system 100. In another embodiment, the mobility platform 103 and/or one or more of the modules 201-209 may be implemented as a cloud-based service, local service, native application, or combination thereof. The functions of the mobility platform 103 and/or the modules 201-209 are discussed with respect to FIGS. 3 and 4 below.

Figure 3:
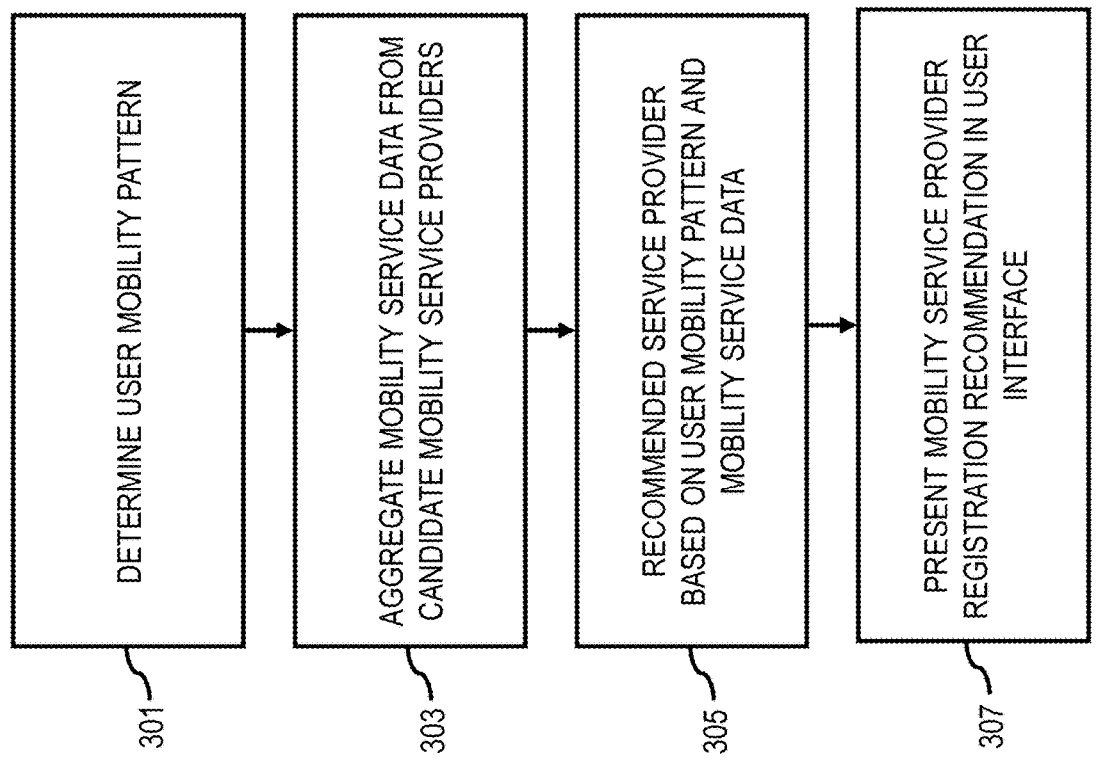
FIG. 3 is a flowchart of a process for providing an automated recommendation of mobility service providers, according to one embodiment.
Figure 8:
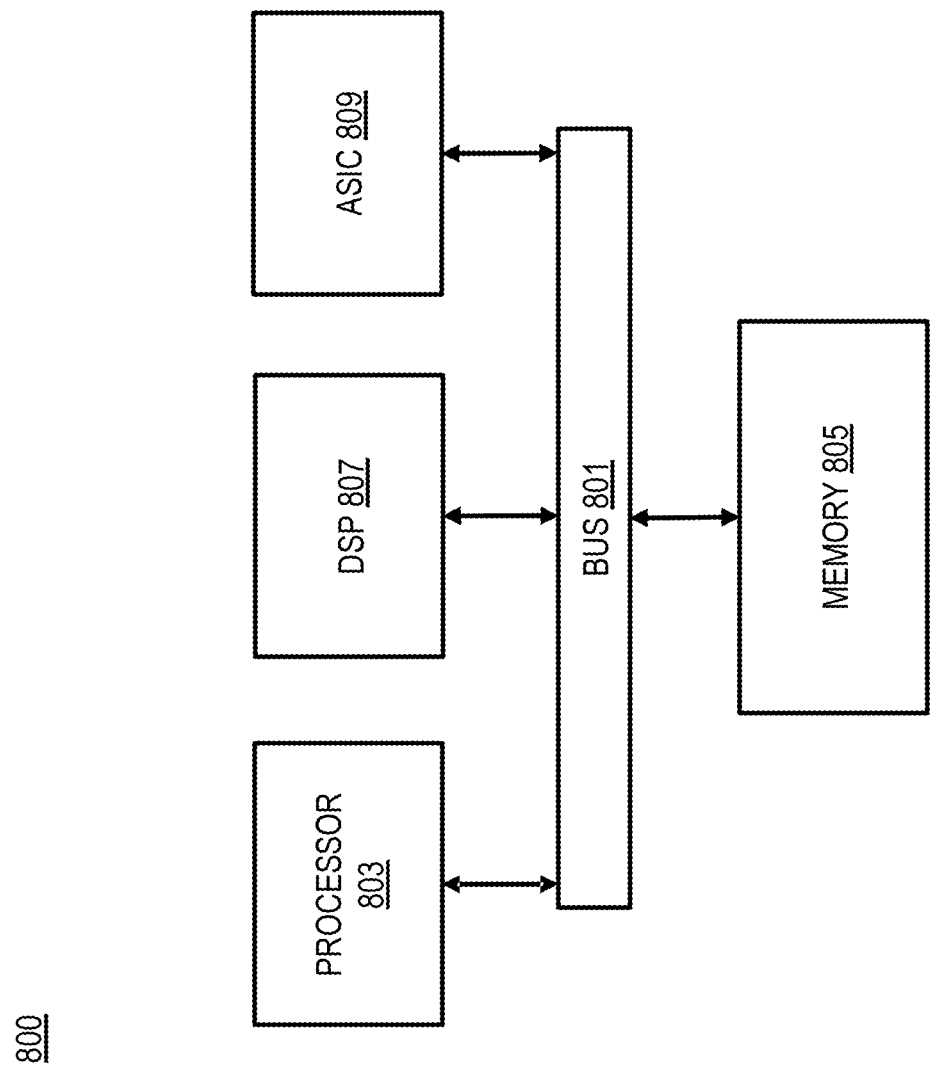
FIG. 8 is a diagram of a chip set that can be used to implement an embodiment of the invention.

FIG. 3 is a flowchart of a process for providing an automated recommendation of mobility service providers, according to one embodiment, according to one embodiment. In various embodiments, the mobility platform 103 and/or the modules 201-209 may perform one or more portions of the process 300 and may be implemented in, for instance, a chip set including a processor and a memory as shown in FIG. 8. As such, the mobility platform 103 and/or modules 201-209 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In step 301, the data collection module 201 determines a mobility pattern associated with a user. In one embodiment, the data collection module 201 determines the mobility pattern associated with the user from historical location sensor data (e.g., GPS sensor 107) over a designated period of time. By way of example, the mobility pattern associated with a user may represent and/or be based on the user's historical travel patterns within an area (e.g., area 113). In one embodiment, the mobility pattern may be based on a user's mobility graph.

In step 303, the data processing module 203 aggregates mobility service data from a plurality of candidate mobility service providers, wherein the plurality of candidate mobility service providers provide shared vehicle services. In one embodiment, the mobility service data includes at least one of: an operating area (e.g., area 113); a pricing model (e.g., cost based on distance, cost based on time, cost based on location, etc.); a number of shared vehicles (e.g., a number of shared vehicles 117 owned and/or operator per mobility operator 115); a distribution of the number of shared vehicles over time (e.g., the distribution of vehicles 117 in terms of times, location, and/or type); historical booking data (e.g., check-in and check-out of each vehicle 117 in the area 113 to compute area trends); shared vehicle availability data (e.g., availability of the vehicles 117 to generate availability prediction models); and one or more service provider-imposed constraints (e.g., pick up and parking area restrictions and/or penalties). By way of example, the distribution of the number of shared vehicles over time may represent the historical availability of desired shared vehicles at the times and locations that a user needs them (e.g., when a user generally leaves work to head home). In other words, the data processing module 203 aggregates the mobility service data so that the analysis module 205 can recommend a mobility service provider that has one or more desired vehicles (e.g., a shared car, scooter, bicycle, etc.) proximate to a user when she/he needs them. In one embodiment, the data processing module 203 can aggregate the historical availability or vehicle distribution over time based on information or data stored in or accessible via a geographic database (e.g., the geographic database 121). In one instance, the candidate mobility service providers include the one or more mobility service providers (e.g., mobility operators 115) that provide shared vehicle services in a given area (e.g., area 113) and that require some form of registration (e.g., registering through the provider's platform or a registration aggregator). In one embodiment, the shared vehicle services include services that enable a user to get from one point (e.g., home) to one or more other points (e.g., work, friend, dinner, etc.) without having to own the vehicle. As described above, it is contemplated that in some instances the shared vehicle services could include autonomous or semi-autonomous vehicles.

In step 305, the analysis module 205 selects at least one recommended mobility service provider from the plurality of candidate mobility service providers based on the mobility pattern and the mobility service data. In one embodiment, the at least one recommended mobility service provider includes a combination of at least two of the plurality of candidate mobility providers (i.e., the combination of operators that are most suitable for the user based on her/his patterns, preferences, and constraints). In one instance, the combination of mobility providers (e.g., mobility operators 115) can enable a user to travel in the given area (e.g., area 113) using one or more multimodal or intermodal routes. For example, a user may routinely travel to work using a shared bicycle, but then returns home using a shared car (e.g., due to the time of night). In one example, the analysis module 205 can select a recommended mobility service provider for each portion of the user's journey. In one embodiment, the analysis module 205 further determines the at least one recommend mobility service provider based on a user preference, a user constraint, or a combination thereof. By way of example, a user preference may include using a shared bicycle or a shared scooter during the week and then using a shared car during the weekends where and when parking may be more available or vice versa depending on the parking patterns in the given area. Another user preference may be that the user prefers to use a shared scooter or shared bicycle (weather permitting) rather than a shared car to get physical exercise. Further, a user preference may include that the user is only interested in registering for services offered by mobility service providers that have a certain user rating (e.g., >3 stars) to leverage the experiences of previous users. By way of example, a user constraint may be that a user usually only has 30 minutes between appointments (e.g., a real-estate broker showing different apartments in various parts of a city).

In one embodiment, the analysis module 205 selects the recommended service provider (e.g., a mobility operator 115) based on determining that the mobility service data (e.g., operator areas, pricing models, number of vehicles, etc.) indicates that the at least one recommended mobility service provider can provide the shared vehicle services that match the mobility pattern associated with the user within a threshold value. By way of example, the shared vehicle services may match the mobility pattern within a threshold value if one or more shared vehicles (e.g., shared cars) of a mobility service provider are generally available for the user to take at or about the given location or address, at or about the time, or a combination thereof where and when the user routinely travels between (e.g., home and office). Similarly, the shared vehicle services may match the mobility pattern within a threshold value if one or more shared vehicles (e.g., shared bicycles) of the mobility service provider are generally priced within or relatively close to the user's travel budget. In other words, the shared vehicle services may match the mobility pattern associated with the user within the threshold if the recommended mobility service provider can provide a suitable solution for the user.

In one instance, the analysis module 205 selects the recommended service provider (e.g., a mobility operator 115) based on determining that the mobility service data (e.g., operator areas, pricing models, number of vehicles, etc.) indicates that the shared vehicle services of at least one recommended mobility service provider can reach at least a threshold percentage of a plurality of destinations (e.g., locations 111) indicated in the mobility pattern associated with the user. By way of example, the shared vehicle services can reach if the operating area of the recommend service provider covers a threshold percentage of the user's common destinations. In other words, one or more shared vehicles of the recommended service provider are available for use at such destinations and a user can take the one or more shared vehicles to her/his next common destination without incurring additional service fees, additional charges, parking penalties, etc. By way of example, the threshold percentage may be at least 75-80% of the user's general destinations. In other words, the operating area of the service covers at least 75-80% of the user's general destinations. In one embodiment, the analysis module 205 can increase or decrease the threshold value dynamically over time. For example, the analysis module 205 may increase the threshold value based on a high number of mobility service providers having shared vehicle services that match the at least 75-80% threshold, user input (e.g., a user may assign a mobility provider that meets the threshold value a low rating for one or more other reasons), etc. In one instance, the analysis module 205 may decrease the threshold value based on a low number of service providers having shared vehicles services that match the at least 75-80% value. As described above, in one instance, the analysis module 205 can rank the one or more mobility service providers that match the mobility pattern within the threshold value. For example, Company A=93%; Company B=85%; and Company C=80% and the user can then decide which of the one or more providers the user wants to register with.

In one embodiment, the analysis module 205 selects the recommended service provider (e.g., a mobility operator 115) based on determining that the mobility service data (e.g., operator areas, pricing models, number of vehicles, etc.) indicates that the shared vehicle services of at least one recommended mobility service provider can reduce an average travel time indicated in the mobility pattern associated with the user. In one instance, the analysis module 205 may select the recommended service provider based on a reduction of an average travel time that meets and/or exceeds a threshold percentage. For example, the analysis module 205 may select the recommended service provider based on a reduction of average travel time by at least 15-20%. In one embodiment, the analysis module 205 can also increase or decrease the threshold percentage dynamically over time like with the threshold percentage of reach or coverage. In one embodiment, if the analysis module 205 determines that more than one service provider can reduce the average travel time of the user by at least or more than the threshold percentage, the analysis module 205 can rank the recommended service providers based on the respective percentages.

In step 307, the communication module 207, in connection with the UI module 209, presents a recommendation for the user to register for the at least one recommended mobility service provider in a user interface. By way of example, the user interface may be a location-based interface (e.g., a mapping application, a routing application, a guidance application, a shared vehicle booking or reservation application, etc.). In one instance, the communication module 207 can present the recommended mobility service providers to a user in a ranked order so that the user can select among the recommended mobility service providers. By way of example, the user interface may include a prompt or message recommending, for example, that the user register with shared car company F and the shared scooter company G to reduce average travel time between home and work by 25%. In one embodiment, the communication module 207 can also present information to guide the user through the registration process (e.g., company A and company B require individual registration, but company F and company G may be simultaneously registered with through a registration aggregator XYZ).

Figure 4:
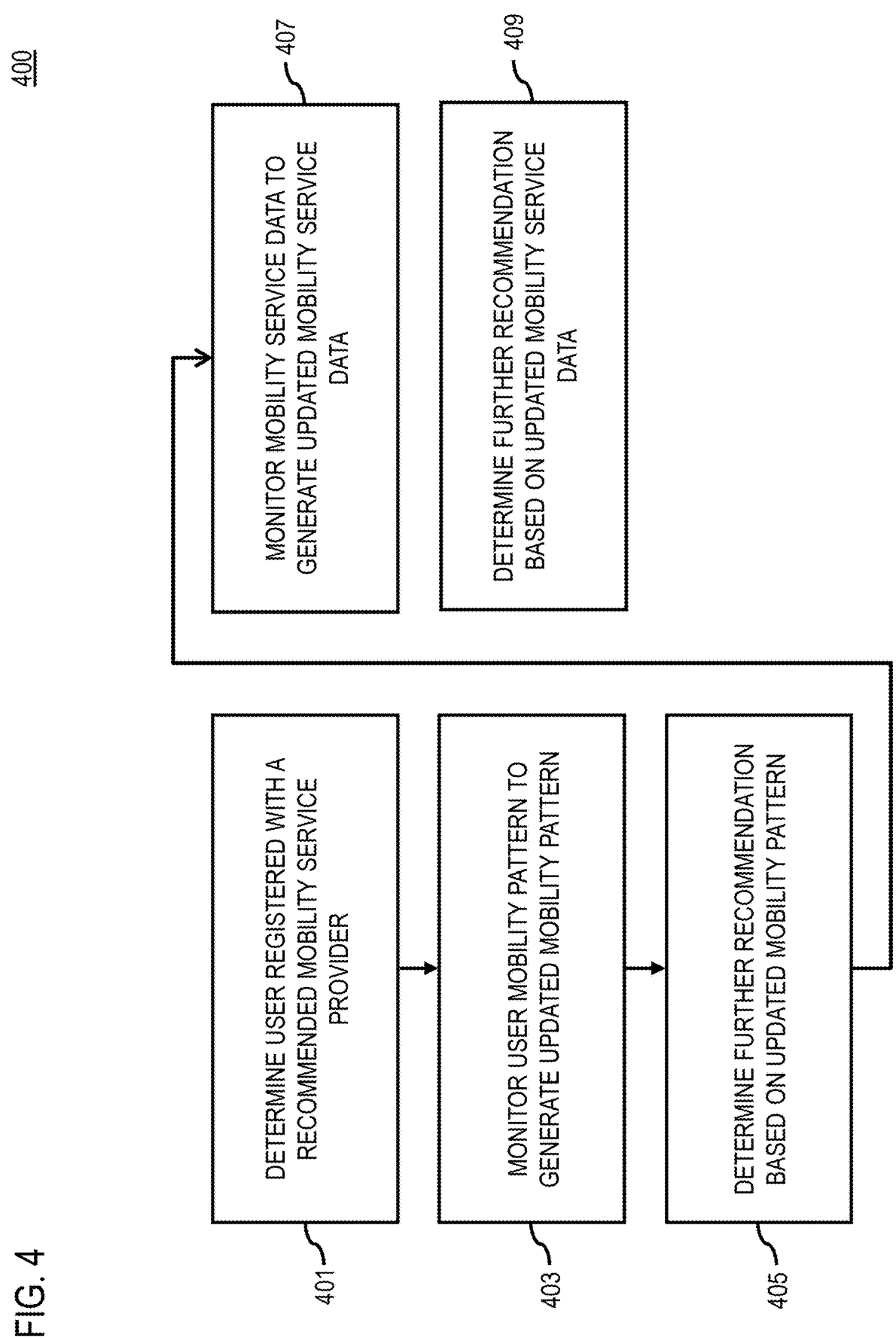
FIG. 4 is a flowchart of a process for providing a further automated recommendation of a mobility service provider based on an updated mobility pattern and/or updated mobility service data, according to one embodiment.

FIG. 4 is a flowchart of a process for providing a further automated recommendation of a mobility service provider based on an updated mobility pattern and/or updated mobility service data, according to one embodiment. In various embodiments, the mobility platform 103 and/or the modules 201-209 may perform one or more portions of the process 400 and may be implement in, for instance, a chip set including a processor and a memory as shown in FIG. 8. As such, the mobility platform 103 and/or modules 201-209 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps. In one embodiment, the process 400 describes additional steps that can be performed in combination with the process 300 described above.

In step 401, the data collection module 201 determines that a user has registered with the at least one recommended mobility service provider. By way of example, the data collection module 201 may determine that a user has registered with a recommend mobility service provider (e.g., one provider or a combination of providers) based on information or data stored in or accessible via a geographic database (e.g., the geographic database 121). As described above, in one instance, a user may register with each recommended mobility service provider individually (e.g., via a provider's platform) or the user may register with the combination of recommended mobility service providers through a registration aggregator. In one embodiment, the data collection module 201 determines whether a user has registered with a recommended mobility service provider in connection with the data processing module 203 monitoring both the user's mobility patterns and/or the mobility service data to determine whether there have been any updates over a designated period of time.

In step 403, the data processing module 203 monitors the mobility pattern associated with a user based on an availability of the at least one recommended mobility service provider for use by the user to generate an updated mobility pattern. In one embodiment, the data processing module 203 begins monitoring a user's mobility pattern once the data collection module 201 determines that the user has registered with and/or is using one or more services of the recommended mobility service provider in step 401. However, it is also contemplated that in certain circumstances (e.g., where computational resources are available), the data processing module 203 may monitor the mobility pattern associated with a user from time to time, periodically, on a schedule, etc. (e.g., where a user consents) irrespective of whether the user has registered with and/or is using one or more services of the recommended mobility service provider. By way of example, the data processing module 203 can monitor the user's mobility pattern to determine whether there have been any changes or updates as result of the user using the recommended service provider (e.g., company A shared bikes and company B shared cars). For example, the data processing module 203 can monitor a user's average travel time between home and work to determine whether there has been a reduction in the user's travel time and, therefore, a consequential change or update to the user's mobility pattern. In one embodiment, the data processing module 203 can monitor the mobility pattern associated with a user based on location data (e.g., GPS sensor 107 data) or information or data stored in or accessible via a geographic data (e.g., the geographic database 121).

In step 405, the analysis module 205 determines a further recommendation with respect to the at least one recommended mobility service provider, at least one additional recommended mobility service provider, or combination thereof based on the updated mobility pattern. In one instance, the analysis module 205 can recommend that the user continue using the recommended mobility service provider (or combination) based on the updated mobility pattern (e.g., a new job location) but may provide a further recommendation with respect to the recommended mobility service provider. For example, whereas the original recommendation consisted of registering for a company A shared bike and a company B shared scooter, as a result of the user's new job location and, therefore, costs savings (e.g., less travel time), the analysis module 205 can further recommend that the user register for the company B shared car to increase convenience and comfortability.

In another instance, the analysis module 205 can recommend based on the updated mobility pattern that the user supplement her/his current registration by adding an additional mobility service provider (e.g., to further reduce time and/or costs, improve convenience, etc.) or by reducing a mobility service provider in situations where the recommended service provider comprises a combination of providers. For example, with the reduction in time spent between locations 111, the user may now be able to reach (e.g., by walking) company C shared bikes, which are faster than the company A shared bikes, and that when used in combination with the company B shared scooter and/or car can further reduce the user's travel time, cost, etc.

In a further example, the analysis module 205 can recommend based on the updated mobility service data that a user register with an altogether different mobility service provider (or combination). For example, the introduction of construction on a route between the user's home and work may now hinder the predicted time savings of taking company B shared and, therefore, the analysis module 205 can select a new recommended service provider or combination (e.g., company D and company E).

In step 407, the data processing module 203 monitors the mobility service data from a plurality of candidate mobility service providers, the at least one recommended mobility service provider, or a combination thereof to generate updated mobility service data. Like in step 403, in one embodiment, the data processing module 203 monitors the mobility service data of one or more mobility service providers once the data collection module 201 determines in step 401 that a user has registered with a recommended mobility service provider (e.g., company A and company B). However, it is also contemplated that in certain circumstances (e.g., where computational resources are available), the data processing module 203 may monitor the mobility service data of one or more mobility service providers in a given area from time to time, periodically, on a schedule, etc. irrespective of a user's registration with and/or use of one or more of the recommended mobility service provider. By way of example, the data processing module 203 can determine whether a change or update has occurred with respect to the operating areas, pricing models, number of vehicles, etc. of one or more mobility service providers in the given area. In one embodiment, the data processing module 203 can determine the change or update based on information or data stored in or accessible via a geographic data (e.g., the geographic database 121).

In step 409, the analysis module 205 determines a further recommendation with respect to the at least one recommended mobility service provider, at least one additional recommended mobility service provider, or combination thereof based on the updated mobility service data. In one instance, like in step 405, the analysis module 205 can recommend that the user continue using the recommended mobility service provider (or combination) based on the updated mobility service data (e.g., change in operating areas, prices, numbers of vehicles, etc.) but may provide a further recommendation to the user with respect to the recommended mobility service provider. For example, the fees associated with shared company A scooters may have dramatically increased and, therefore, the user should consider using company A shared bicycles instead. In another instance, the analysis module 205 can recommend based on the updated mobility service data that the user supplement her/his current registration by adding an additional mobility service or by removing a mobility service provider if the recommended mobility service provider comprises a combination of providers. For example, company C is running a 1-month promotion wherein the fees associated with shared bicycles are half off. In a further example, the analysis module 205 can recommend based on the updated mobility service data that a user register with a completely different mobility service provider (or combination). For example, new government regulations may have caused a dramatic decrease in the operating area of company A and company B and, therefore, the analysis module 205 now recommends that the user register with the mobility service providers C and D.

Figure 5B:
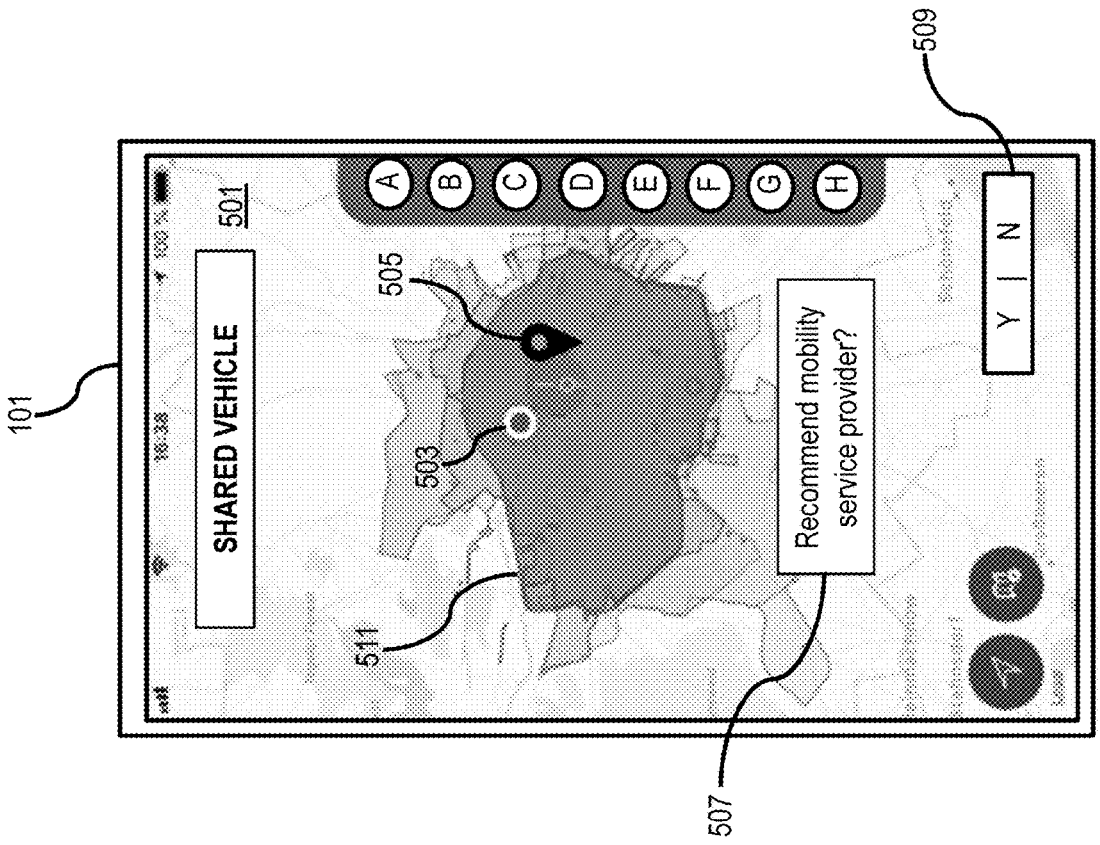
FIGS. 5A through 5G are diagrams of example user interfaces for providing an automated recommendation of mobility service providers, according to one embodiment.
Figure 5A:
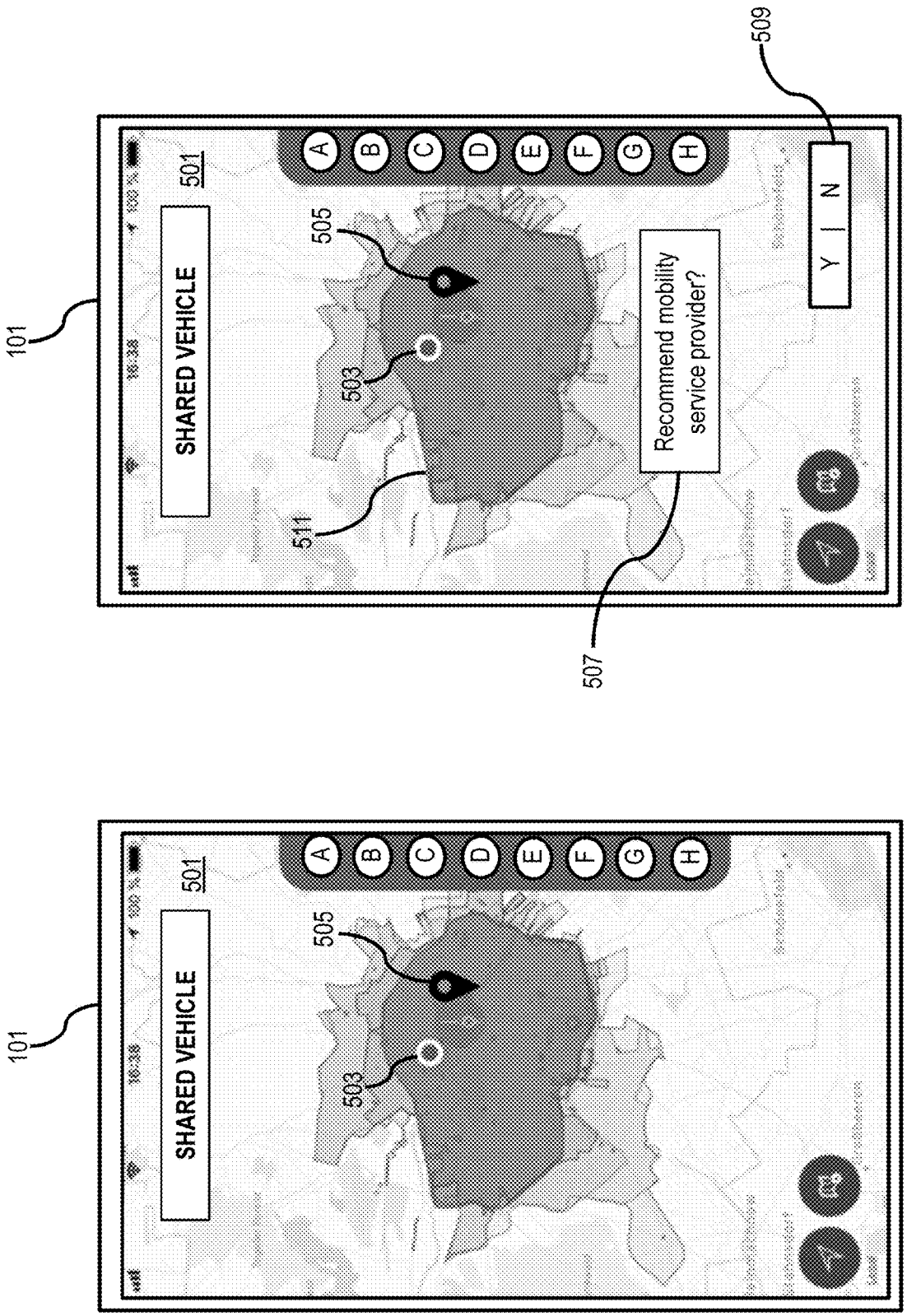

FIGS. 5A through 5G are diagrams of example user interfaces for providing an automated recommendation of mobility service providers, according to one embodiment. In this example, a location-based UI 501 (e.g., a shared vehicle registration application 109) is generated for a UE 101 (e.g., a mobile device, a smartphone, etc.) that can assist a user decide which of many potential mobility service providers (e.g., mobility service providers A-H) is most suitable for her/his needs, as depicted in FIG. 5A.

In one example, a user may have just moved to the given area shown in the UI 501 (e.g., a city center) and the user wants to know the most efficient and/or least expensive way to routinely travel (e.g., using a shared vehicle) from her/his house 503 to her/his work 505 without being constrained by public transportation (e.g., specific arrival and departure times) or burdened by fulltime car ownership (e.g., maintenance costs). In another instance, a user may want to try using a shared vehicle (e.g., a car, bicycle, scooter, etc.) for the first time and, therefore, is looking into the available mobility service providers in the area. In a further example, a user may be familiar with the various mobility services and/or providers A-H in the area but is curious to know whether any of the providers have recently updated their services (e.g., a change in operating areas, pricing, number or types of vehicles, etc.).

In one embodiment, the system 100 determines a mobility pattern associated with the user from historical location sensor data (e.g., GPS sensor 107 data). For example, the system 100 can determine a user's mobility pattern based on information or data stored in or accessible via a geographic database (e.g., the geographic database 121), a digital map (e.g., an application 109) associated with the UE 101, or a combination thereof. In one instance, the system 100 can determine the mobility pattern based on one or more user interactions with the UI 501. For example, the system 100 may present a query to the user via the prompt 507 (e.g., "Recommend mobility service provider?") and the user may respond to the query via one or more user interactions with the input 509 (e.g., a touch, a gesture, a tap, a voice command, etc.), as depicted in FIG. 5B.

In one embodiment, the system 100 aggregates or collects mobility service data from potential mobility service providers in the area (e.g., mobility service providers A-H). In one instance, the system 100 can collect or aggregate respective operating areas, pricing models, number of vehicles—vehicle distributions over time, booking events, constraints, etc. in connection with the available mobility service providers. In one embodiment, the system 100 can graphically represent to a user one or more underlying data sets associated with the available mobility service providers via the UI 501 (e.g., upon request). In this example, a user requested to view the respective operating areas (e.g., operating area 511) of the mobility service providers A-H. In this instance, the user can see that her/his home 503 and work 505 are within most, if not all, operating areas. Therefore, the user may be uncertain which mobility service provider is most suitable for her/his needs based on this criterion alone.

Figure 5D:
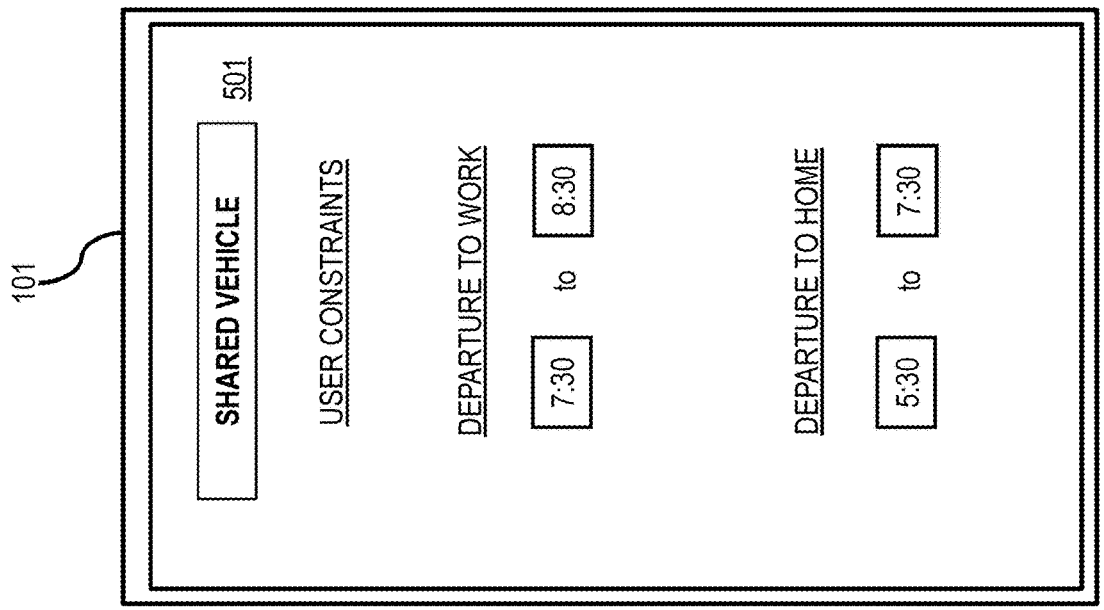
Figure 5C:
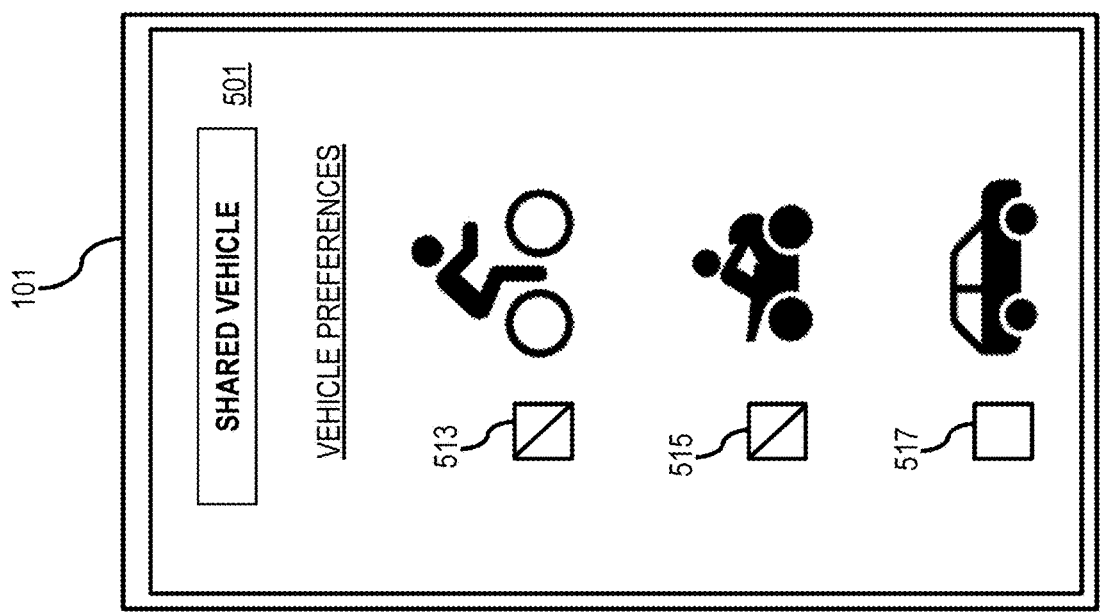

In addition to determining the mobility pattern of a user, in one embodiment, the system 100 can generate the UI 501 such that a user can input one or more preferences, one or more constraints (e.g., time, appointments, etc.) with respect to shared vehicle services. In one embodiment, the system 100 can enable a user to input her/his preferences via the UI 501, as depicted in FIG. 5C. For example, the user may have a preference to travel by a shared bicycle (as shown by the input 513) and/or a shared scooter (as shown by the input 515) but would rather not travel by a shared car (as shown by the input 517) (e.g., to minimize expense and/or to avoid parking). In one embodiment, the user preferences could also include cost, rating, or other any means by which to differentiate among shared vehicle services and/or mobility service providers (e.g., mobility service providers A-H). In one embodiment, the system 100 can also enable a user to input her/his constraints via the UI 501, as depicted in FIG. 5D. In this instance, the user has identified a constraint and/or a preference with respect to her/his preferred departure times. For example, the user may want to avoid rush hour traffic, the user may want to have a greater chance in finding available shared vehicles, etc.

In one embodiment, the system 100 selects a recommended mobility service provider from among the potential providers (e.g., mobility service providers A-H) based on the user mobility pattern, preferences, constraints, or a combination thereof and the mobility service data. In one embodiment, the system 100 determines the recommended mobility service provider based on a match between the user inputs (e.g., mobility pattern, preferences, constraints) and the most suitable combination of mobility service providers. In one instance, the system 100 can determine the recommended mobility service providers based on mobility service data indicating that the mobility service provider can reach at least a threshold percentage of a user's destinations. As mentioned above, in this example, it appears that all the mobility service providers A-H can reach most, if not all, of the user's destinations (e.g., home 503 and office 505).

In one embodiment, the system 100 can also determine the recommended mobility service provider based on mobility service data indicating that a mobility service provider can reduce an average travel time indicated in the user's mobility patterns. For example, the system 100 may determine (e.g., based on the user's mobility pattern) that it ordinarily takes the user 20 minutes to travel between her/his home 503 and office 505 via public transportation. In addition, the system 100 can determine (e.g., by the mobility service data) that use of a shared vehicle owned or operated by mobility service providers A and D can reduce that travel time by at least half, that use of a shared vehicle owned or operated by mobility service provider B will only reduce the travel time minimally, and that user of a shared vehicle owned or operated by mobility service provider C will not reduce the travel time at all, as depicted in graph 519 of FIG. 5E. In one instance, the system 100 presents the recommended mobility service providers in ranked order (e.g., A, D, B, C) based on the determined reductions in travel time. In one embodiment, the system 100 can generate the UI 501 such that it includes an input 521 to enable a user to select which mobility service provider among the ranked mobility service providers that the user wants to register with (e.g., mobility service provider A).

Figure 5F:
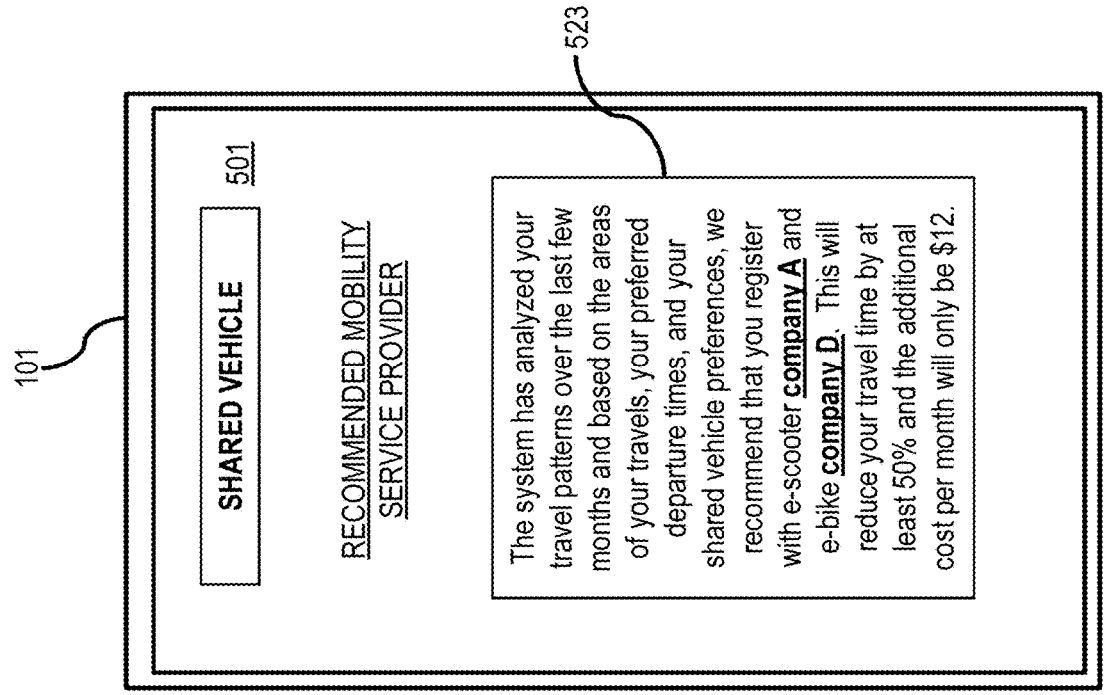
Figure 5E:
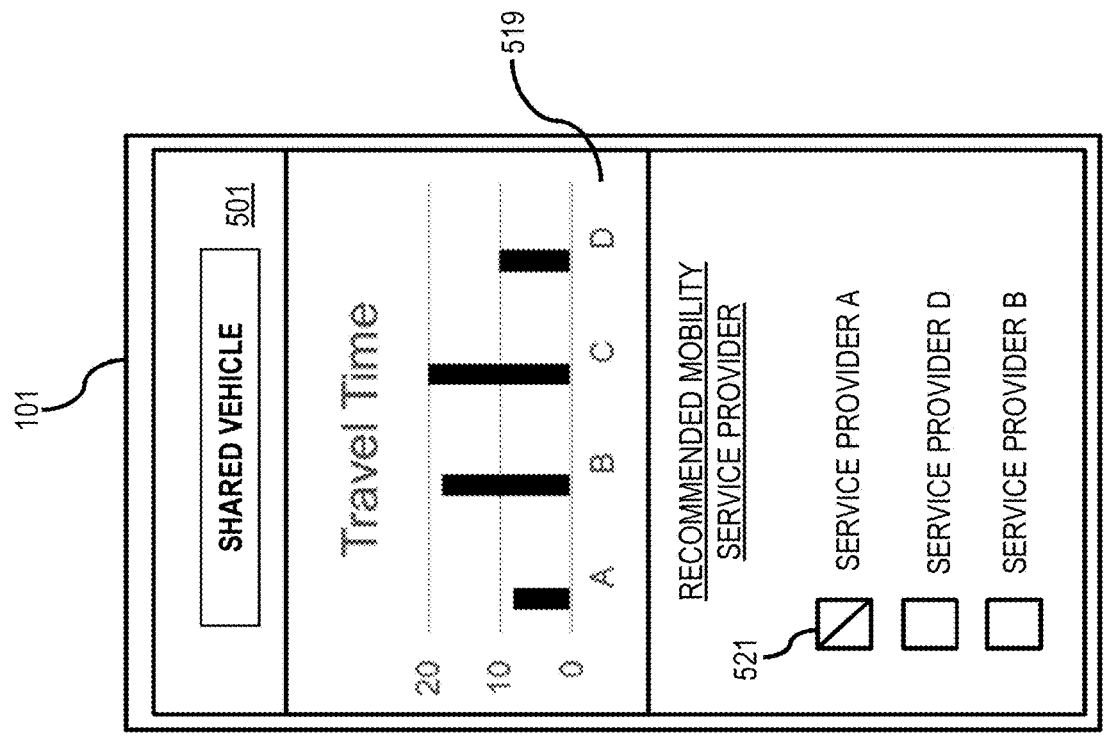
Figure 5G:
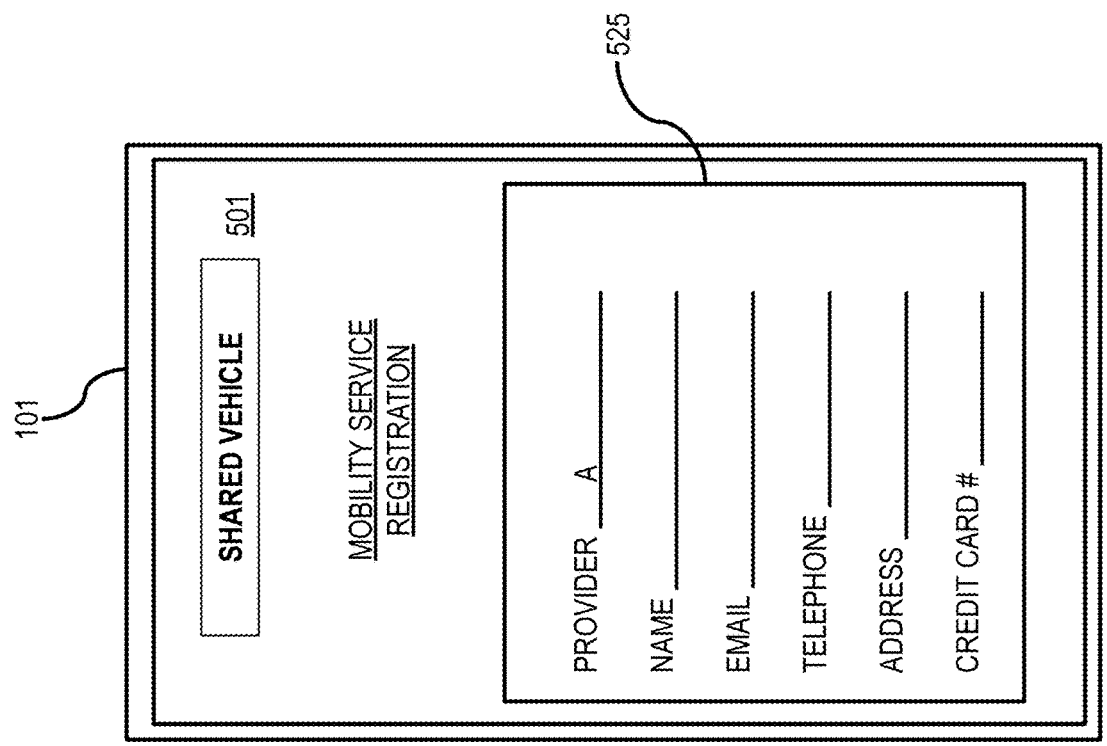

In one embodiment, the system 100 can present the recommendation for the user to register with the recommended mobility service provider (or combination) in the display 523 of the UI 501, as depicted in FIG. 5F. For example, the system 100 may present the recommendation as follows: The system has analyzed your travel patterns over the last few months and based on the areas of your travels, your preferred travel times, and your shared vehicle preferences, it is recommended that you register with e-scooter company A and e-bike company D. This will allow you reduce your travel time by at least 50% and the additional cost per month will be only $12. In one embodiment, the system 100 may generate the display 523 such that it includes one or more hyperlinks to allow the user to jump directly to the mobility service provider's registration page (e.g., company A and/or company D).

In one embodiment, once a user selects a recommended mobility service provider (or combination) (e.g., mobility service provider A), the system 100 can enable the user to jump directly to the mobility service provider's registration page, a registration aggregator page, or in one embodiment, the system 100 can generate the UI 501 with an input 525 wherein the user can fill in the required registration information. In one instance, the system 100 can prepopulate the input 525 information based on information or data stored in or accessible via a geographic database (e.g., the geographic database 121).

Returning to FIG. 1, in one embodiment, the UEs 101 can be associated with any of the vehicles 117 (e.g., a shared car) or a person traveling within a vehicle 117. By way of example, the UEs 101 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that a UE 101 can support any type of interface to the user (such as "wearable" circuitry, etc.). In one embodiment, the vehicles 117 may have cellular or wireless fidelity (Wi-Fi) connection either through the inbuilt communication equipment or from a UE 101 associated with the vehicles 117. Also, the UEs 101 may be configured to access the communication network 105 by way of any known or still developing communication protocols. In one embodiment, the UEs 101 may include the mobility platform 103 to provide an automated recommendation of mobility service providers.

In one embodiment, the UEs 101 include device sensors 107 (e.g., a front facing camera, a rear facing camera, GPS sensors, multi-axial accelerometers, height sensors, tilt sensors, moisture sensors, pressure sensors, wireless network sensors, etc.) and applications 109 (e.g., mapping applications, shared vehicle booking or reservation applications, routing applications, guidance applications, navigation applications, etc.). In one example embodiment, the GPS sensors 107 can enable the UEs 101 to obtain geographic coordinates from satellites 123 for determining current or live location and time. Further, a user location within the area 113 may be determined by a triangulation system such as A-GPS, Cell of Origin, or other location extrapolation technologies when cellular or network signals are available.

In one embodiment, the mobility platform 103 performs the process for providing an automated recommendation of mobility service providers as discussed herein with respect to the various embodiments described herein. In one embodiment, the mobility platform 103 can be a standalone server or a component of another device with connectivity to the communication network 105. For example, the component can be part of an edge computing network where remote computing devices (not shown) are installed along or within proximity of an intended destination (e.g., a city center).

In one embodiment, the mobility platform 103 has connectivity over the communication network 105 to the services platform 125 (e.g., an OEM platform) that provides one or more services 127a-127n (also collectively referred to herein as services 127) (e.g., traffic/routing services). By way of example, the services 127 may also be other third-party services and include mapping services, navigation services, travel planning services, reservation services (e.g., booking a shared vehicle 117), notification services, social networking services, content (e.g., audio, video, images, etc.) provisioning services, application services, storage services, contextual information determination services, location-based services, information-based services (e.g., weather, news, etc.), etc. By way of example, the services 127 may be online services that reflect interests, recommendations, reviews, and/or activities of users as well as reviews of mobility service providers (e.g., based on a star or point rating system). In one instance, the services 127 provide representations of each user (e.g., a profile), his/her social links, and a variety of additional information. In one instance, the services 127 can allow users to share location information, activities information, POI related information, contextual information, and interests within their individual networks, and provides for data portability.

In one embodiment, content providers 129a-129n (also collectively referred to herein as content providers 129) may provide content or data (e.g., navigation-based content such as destination information, routing instructions, POI related data, historical data; shared vehicle content such as vehicle type, vehicle operator; etc.) to the UEs 101, the mobility platform 103, the applications 109, mobility service providers 115, the shared vehicles 117, the geographic database 121, the services platform 125, and the services 127. The content provided may be any type of content, such as map content, contextual content, audio content, video content, image content, etc. In one embodiment, the content providers 129 may also store content associated with the UEs 101, the mobility platform 103, the applications 109, the mobility service providers 115, the shared vehicles 117, the geographic database 121, the services platform 125, and/or the services 127. In another embodiment, the content providers 129 may manage access to a central repository of data, and offer a consistent, standard interface to data, such as a repository of the geographic database 121.

By way of example, as previously stated the vehicle sensors 119 may be any type of sensor. In certain embodiments, the vehicle sensors 119 may include, for example, a global positioning sensor (GPS) for gathering location data, a network detection sensor for detecting wireless signals or receivers for different short-range communications (e.g., Bluetooth, Wi-Fi, light fidelity (Li-Fi), near field communication (NFC) etc.), temporal information sensors, a camera/imaging sensor for gathering image data (e.g., lights or exhaust associated with a shared vehicle 117 that is no longer available for use (i.e., checked-out)), velocity sensors, and the like. In another embodiment, the vehicle sensors 119 may include sensors (e.g., mounted along a perimeter of the vehicle 117) to detect the relative distance of the vehicle from lanes or roadways, the presence of other vehicles 117, pedestrians, animals, traffic lights, road features (e.g., curves) and any other objects, or a combination thereof. In one scenario, the vehicle sensors 119 may detect weather data, traffic information, or a combination thereof. In one example embodiment, the vehicles 117 may include GPS receivers to obtain geographic coordinates from the satellites 123 for determining current or live location and time. Further, the location can be determined by a triangulation system such as A-GPS, Cell of Origin, or other location extrapolation technologies when cellular or network signals are available. In another example embodiment, the services 127 may provide in-vehicle navigation services.

The communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mobility platform 103 may be a platform with multiple interconnected components. By way of example, the mobility platform 103 may include multiple servers, intelligent networking devices, computing devices, components and corresponding software for providing an automated recommendation of mobility service providers. In addition, it is noted that the mobility platform 103 may be a separate entity of the system 100, a part of the services platform 125, the services 127, or the content providers 129.

In one embodiment, the geographic database 121 stores information regarding a mobility pattern associated with a user, user preferences, user constraints, mobility service data from candidate mobility service providers, user registers with a recommended mobility service provider, updated mobility patters, updated mobility service data, historical location sensor data associated with a user, or a combination thereof. The information may be any of multiple types of information that can provide means for providing an automated recommendation of mobility service providers. In another embodiment, the geographic database 121 may be in a cloud and/or in a UE 101, a vehicle 119, or a combination thereof.

By way of example, the UEs 101, the mobility platform 103, the applications 109, the vehicles 117, the geographic database 121, the satellites 123, the services platform 125, the services 127, and the content providers 129 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 6:
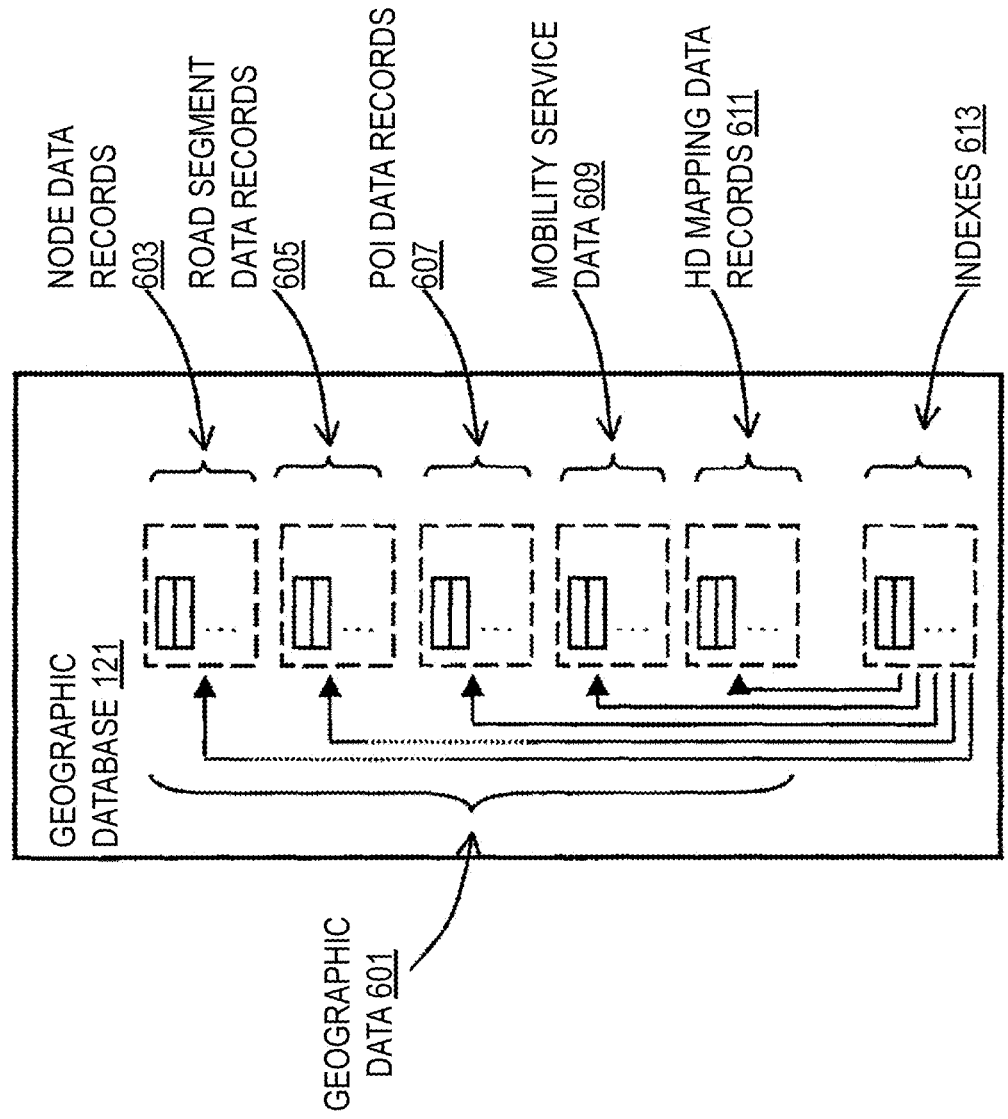
FIG. 6 is a diagram of a geographic database, according to one embodiment.

FIG. 6 is a diagram of a geographic database, according to one embodiment. In one embodiment, geographic database 121 includes geographic data 601 used for (or configured to be compiled to be used for) mapping (e.g., mobility pattern information) and/or navigation-related services, such as for video odometry based on the mapped features, e.g., lane lines, road markings, signs, etc. In one embodiment, geographic database 121 includes high resolution or high definition (HD) mapping data that provide centimeter-level or better accuracy of map features. For example, geographic database 121 can be based on Light Detection and Ranging (LiDAR) or equivalent technology to collect billions of 3D points and model road surfaces and other map features down to the number lanes and their widths. In one embodiment, the HD mapping data, e.g., HD mapping data records 611, capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features, e.g., two-dimensional or three-dimensional features, are represented using polygons, e.g., two-dimensional features, or polygon extrusions, e.g., three-dimensional features. For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in geographic database 121.

"Node"—A point that terminates a link.

"Line segment"—A straight line connecting two points.

"Link" (or "edge")—A contiguous, non-branching string of one or more-line segments terminating in a node at each end.

"Shape point"—A point along a link between two nodes, e.g., used to alter a shape of the link without defining new nodes.

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary, e.g., a hole or island. In one embodiment, a polygon is constructed from one outer simple polygon and none or at least one inner simple polygon. A polygon is simple if it just consists of one simple polygon, or complex if it has at least one inner simple polygon.

In one embodiment, geographic database 121 follows certain conventions. For example, links do not cross themselves and do not cross each other except at a node. Also, there are no duplicated shape points, nodes, or links. Two links that connect each other have a common node. In geographic database 121, overlapping geographic features are represented by overlapping polygons. When polygons overlap, the boundary of one polygon crosses the boundary of the other polygon. In geographic database 121, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, geographic database 121 includes node data records 603, road segment or link data records 605, POI data records 607, mobility service data 609, HD mapping data records 611, and indexes 613, for example. More, fewer or different data records can be provided. In one embodiment, additional data records (not shown) can include cartographic ("carto") data records, routing data, and maneuver data. In one instance, the additional data records (not shown) can include user mobility pattern data. In one embodiment, the indexes 613 may improve the speed of data retrieval operations in geographic database 121. In one embodiment, the indexes 613 may be used to quickly locate data without having to search every row in geographic database 121 every time it is accessed. For example, in one embodiment, the indexes 613 can be a spatial index of the polygon points associated with stored feature polygons.

In exemplary embodiments, the road segment data records 605 are links or segments representing roads, streets, or paths, as can be used in the determining mobility patterns associated with a user. The node data records 603 are end points corresponding to the respective links or segments of the road segment data records 605. The road link data records 605 and the node data records 603 represent a road network, such as used by shared vehicles (e.g., cars, bicycles, scooters, etc.) and/or other entities. Alternatively, the geographic database 121 can contain path segment and node data records or other data that represent pedestrian paths, bicycle paths, or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs (e.g., general or personal POIs), such as home, office, a friend's house, gasoline stations, hotels, restaurants, museums, stadiums, offices, automobile dealerships, auto repair shops, buildings, stores, parks, etc. The geographic database 121 can include data about the POIs and their respective locations in the POI data records 607. In one instance, the POI data records 607 can include information regarding popular times at a POI, how long people typically spend at a POI, opening and closing times of a POI, etc. The geographic database 123 can also include data about places, such as cities, towns, or other communities, and other geographic features, such as bodies of water, mountain ranges, etc. Such place or feature data can be part of the POI data records 607 or can be associated with POIs or POI data records 607 (such as a data point used for displaying or representing a position of a city).

In one embodiment, the geographic database 121 can also include mobility service data 609. By way of example, the mobility service data 609 may include mobility operators operating areas, pricing models, number of shared vehicles (e.g., cars, bicycles, scooters, etc.), the shared vehicle distributions over time, the booking events (e.g., check-in and check-out of each vehicle), area trends, availability prediction models, constraints (e.g., reservation, parking, etc.), etc. In one instance, the service mobility data records 609 may include owners and/or operators of shared vehicles in the given area. In another embodiment, the mobility service data 609 stores information relating to the one or more shared vehicles, e.g., vehicle type, vehicle features, ratings and/or reviews, etc. By way of example, the mobility service data 609 can be associated with one or more of the node data records 603, road segment data records 605, and/or POI data records 607 to support localization and opportunistic use of the shared vehicles during commuting.

In one embodiment, as discussed above, the HD mapping data records 611 model road surfaces and other map features to centimeter-level or better accuracy. The HD mapping data records 611 also include lane models that provide the precise lane geometry with lane boundaries, as well as rich attributes of the lane models. These rich attributes include, but are not limited to, lane traversal information, lane types, lane marking types, road signs, lane level speed limit information, and/or the like. In one embodiment, the HD mapping data records 611 are divided into spatial partitions of varying sizes to provide HD mapping data to the UEs 101 or the vehicles 117 with near real-time speed without overloading the available resources of the UEs 101 and/or the vehicles 117, e.g., computational, memory, bandwidth, etc. resources.

In one embodiment, the HD mapping data records 611 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 611.

In one embodiment, the HD mapping data records 611 also include real-time sensor data collected from probe vehicles in the field. The real-time sensor data, for instance, integrates real-time traffic information, weather, and road conditions, e.g., potholes, road friction, road wear, etc., with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, geographic database 121 can be maintained by a content provider 129 in association with the services platform 125, e.g., a map developer. The map developer can collect geographic data to generate and enhance geographic database 121. There can be different ways used by the map developer to collect data. These ways can include obtaining data from other sources, such as municipalities or respective geographic authorities. In addition, the map developer can employ field personnel to travel by vehicle (e.g., a vehicle 117) and/or travel with a UE 101 along roads throughout the geographic region to observe features and/or record information about them, for example. Also, remote sensing, such as aerial or satellite photography, can be used (e.g., using one or more satellites 123).

The geographic database 121 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101 or a shared vehicle 117, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing an automated recommendation of mobility service providers may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
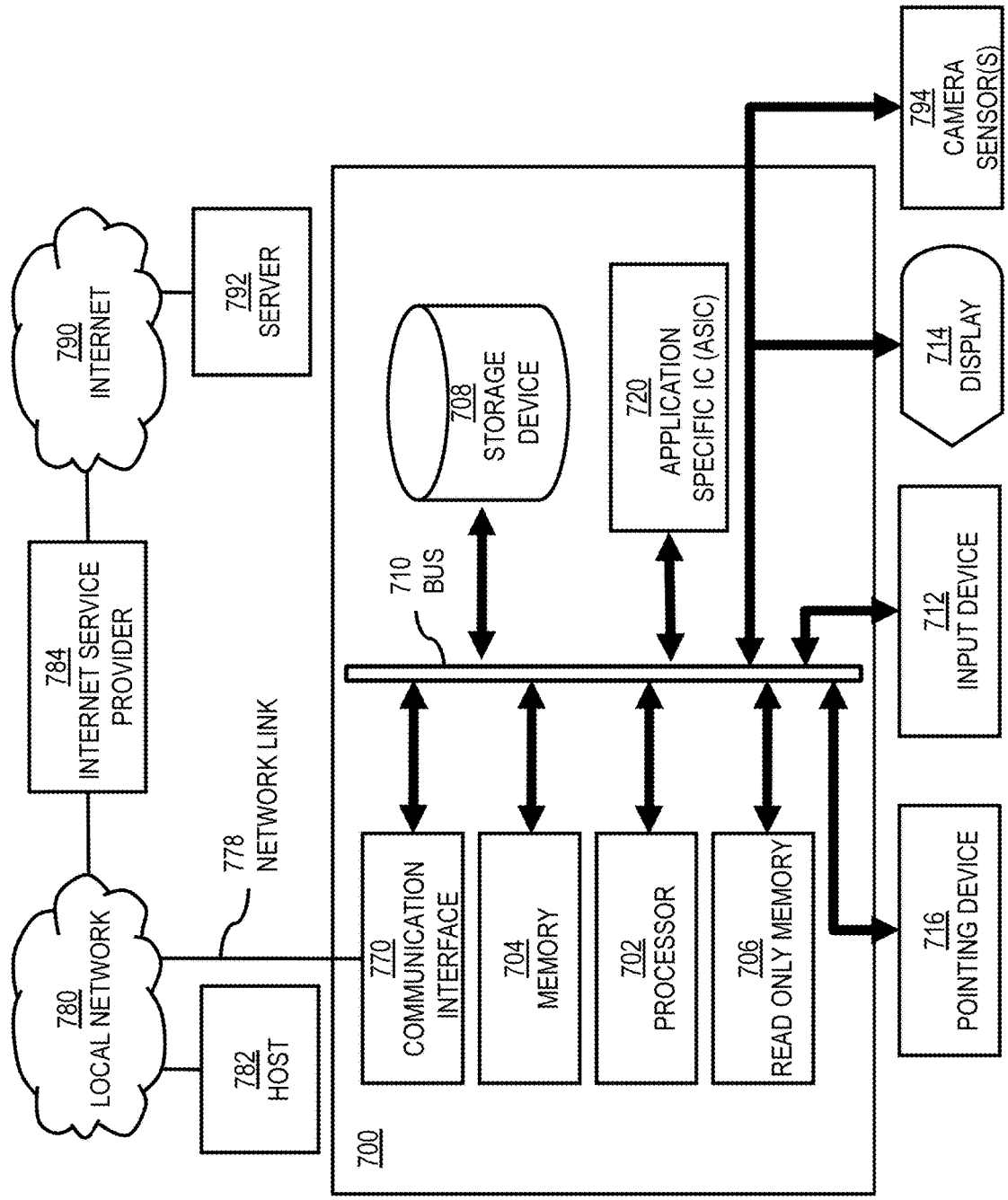
FIG. 7 is a diagram of hardware that can be used to implement an embodiment of the invention.

FIG. 7 illustrates a computer system 700 upon which an embodiment of the invention may be implemented. Computer system 700 is programmed (e.g., via computer program code or instructions) to provide an automated recommendation of mobility service providers as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to providing an automated recommendation of mobility service providers. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random-access memory (RAM) or other dynamic storage device, stores information including processor instructions for providing an automated recommendation of mobility service providers. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing an automated recommendation of mobility service providers, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general, the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing an automated recommendation of mobility service providers.

The term non-transitory computer-readable medium is used herein to refer to any medium that participates in providing information to processor 702, including instructions for execution. Such a medium may take many forms, including, but not limited to, non-volatile media, volatile media and transmission media. Non-volatile or non-transitory media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

In one embodiment, a non-transitory computer-readable storage medium carrying one or more sequences of one or more instructions (e.g., computer code) which, when executed by one or more processors (e.g., a processor as described in FIG. 5), cause an apparatus (e.g., the vehicles 101, the UEs 105, the mobility platform 103, etc.) to perform any steps of the various embodiments of the methods described herein.

FIG. 8 illustrates a chip set 800 upon which an embodiment of the invention may be implemented. Chip set 800 is programmed to provide an automated recommendation of mobility service providers as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide an automated recommendation of mobility service providers. The memory 805 also stores the data associated with or generated by the execution of the inventive steps.

Figure 9:
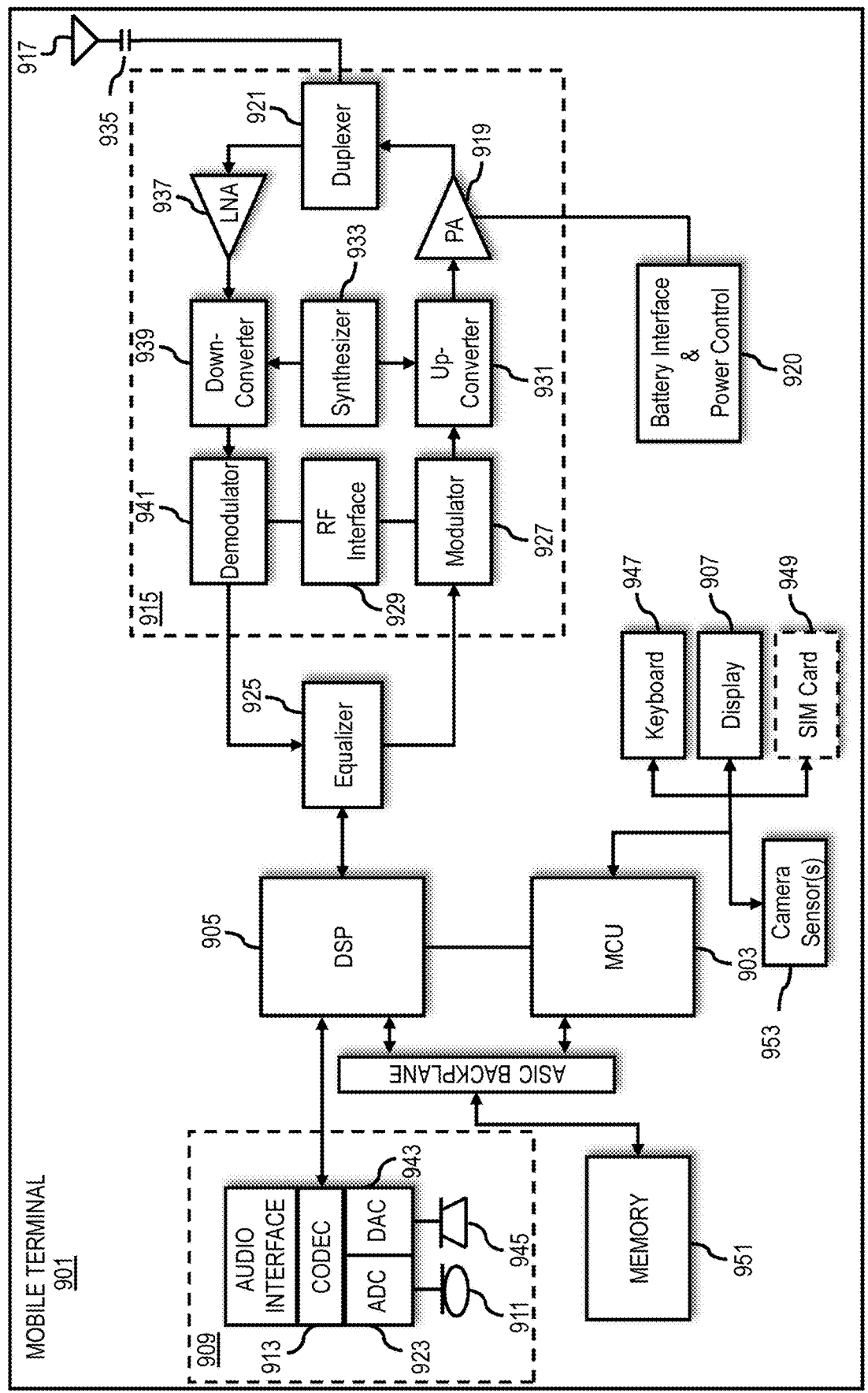
FIG. 9 is a diagram of a mobile terminal (e.g., handset or vehicle or part thereof) that can be used to implement an embodiment of the invention.

FIG. 9 is a diagram of exemplary components of a mobile terminal 901 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), WiFi, satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to provide an automated recommendation of mobility service providers. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable non-transitory computer readable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing an automated recommendation of mobility service providers comprising:
    determining a mobility pattern associated with a user, wherein the mobility pattern includes a plurality of user destinations;
    aggregating mobility service data from a plurality of candidate mobility service providers, wherein each of the plurality of candidate mobility service providers provides shared vehicle services, and wherein the mobility service data includes an operating area for the respective mobility service provider;
    selecting at least one recommended mobility service provider from the plurality of candidate mobility service providers based on a threshold of user destinations being covered by the operating area included in the mobility service data; and
    presenting a recommendation for the user to register with the at least one recommended mobility service provider in a user interface.

2. The method of claim 1, wherein the at least one recommended mobility service provider includes a combination of at least two of the plurality of candidate mobility service providers.

3. The method of claim 1, wherein the mobility service data further includes at least one of:
    a pricing model;
    a number of shared vehicles;
    a distribution of the number of shared vehicles over time;
    historical booking event data;
    shared vehicle availability data;
    public transport system data; and
    one or more service provider-imposed constraints.

4. The method of claim 1, wherein the at least one recommended mobility service provider is further determined based on a user preference, a user constraint, or a combination thereof.

5. The method of claim 1, further comprising:
    determining that the user has registered with the at least one recommended mobility service provider;
    monitoring the mobility pattern associated with the user based on an availability of the at least one recommended mobility service provider for use by the user to generate an updated mobility pattern; and
    determining a further recommendation with respect to the at least one recommended mobility service provider, at least one additional recommended mobility service provider, or a combination thereof based on the updated mobility pattern.

6. The method of claim 1, further comprising:
    determining that the user has registered with the at least one recommended mobility service provider;
    monitoring the mobility service data from the plurality of candidate mobility service providers, the at least one recommended mobility service provider, or a combination thereof to generate an updated mobility service data; and
    determining a further recommendation with respect to the at least one recommended mobility service provider, at least one additional recommended mobility service provider, or a combination thereof based on the updated mobility service data.

7. The method of claim 3, wherein the at least one recommended mobility service provider is further selected based on determining that the mobility service data indicates that the at least one recommended mobility service provider can provide the shared vehicle services that match the mobility pattern associated with the user within a threshold value.

8. The method of claim 1, wherein the at least one recommended mobility service provider is selected based on determining that the mobility service data indicates that the shared vehicle services of at least one recommended mobility service provider can reduce an average travel time indicated in the mobility pattern associated with the user.

9. The method of claim 1, wherein the mobility pattern is determined from historical location sensor data collected over a designated period of time.

10. An apparatus for providing an automated recommendation of mobility service providers comprising:
    at least one processor; and
    at least one memory including computer program code for one or more programs,
    the at least one memory and the computer program code configured to, with the at least one processor, cause the apparatus to perform at least the following,
        determine a mobility pattern, a user preference, a user constraint, or a combination thereof associated with a user, wherein the mobility pattern includes a plurality of user destinations;
        aggregate mobility service data from a plurality of candidate mobility service providers, wherein each of the plurality of candidate mobility service providers provides shared vehicle services, and wherein the mobility service data includes an operating area for the respective mobility service provider;
        select at least one recommended mobility service provider from the plurality of candidate mobility service providers based on a threshold of user destinations being covered by the operating area included in the mobility pattern, the user preference, the user constraint, or the combination thereof and the mobility service data; and
        present a recommendation for the user to register with the at least one recommended mobility service provider in a user interface.

11. The apparatus of claim 10, wherein the at least one recommended mobility service provider includes a combination of at least two of the plurality of candidate mobility service providers.

12. The apparatus of claim 10, wherein the mobility service data further includes at least one of:
a pricing model;
a number of shared vehicles;
a distribution of the number of shared vehicles over time;
historical booking event data;
shared vehicle availability data;
public transport system data; and
one or more service provider-imposed constraints.

13. The apparatus of claim 12, wherein the recommendation for the user to register for the least one recommended mobility service provider includes a comparison to the public transport system data.

14. The apparatus of claim 10, wherein the apparatus is further caused to:
determine that the user has registered with the at least one recommended mobility service provider;
monitor the mobility pattern, the user preference, the user constraint, or the combination thereof associated with the user based on an availability of the at least one recommended mobility service provider for use by the user to generate an updated mobility pattern, an updated user preference, an updated user constraint, or a combination thereof; and
determine a further recommendation with respect to the at least one recommended mobility service provider, at least one additional recommended mobility service provider, or a combination thereof based on the updated mobility pattern, the updated user preference, the updated user constraint, or the combination thereof.

15. The apparatus of claim 10, wherein the apparatus is further caused to:
determine that the user has registered with the at least one recommended mobility service provider;
monitor the mobility service data from the plurality of candidate mobility service providers, the at least one recommended mobility service provider, or a combination thereof to generate updated mobility service data; and
determine a further recommendation with respect to the at least one recommended mobility service provider, at least one additional recommended mobility service provider, or a combination thereof based on the updated mobility service data.

16. The apparatus of claim 12, wherein the at least one recommended mobility service provider is further selected based on determining that the mobility service data indicates that the at least one recommended mobility service provider can provide the shared vehicle services that match the mobility pattern associated with the user within a threshold value.

17. A non-transitory computer-readable storage medium for providing an automated recommendation of mobility service providers carrying one or more sequences of one or more instructions which, when executed by one or more processors, cause an apparatus to perform:
determining a mobility pattern associated with a user, wherein the mobility pattern includes a plurality of user destinations;
aggregating mobility service data from a plurality of candidate mobility service providers, wherein each of the plurality of candidate mobility service providers provides shared vehicle services, and wherein the mobility service data includes an operating area for the respective mobility service provider;
selecting at least one recommended mobility service provider from the plurality of candidate mobility service providers based on a threshold of user destinations being covered by the operating area included in the mobility pattern and the mobility service data; and
presenting a recommendation for the user to register with the at least one recommended mobility service provider in a user interface.

18. The non-transitory computer-readable storage medium of claim 17, wherein the at least one recommended mobility service provider includes a combination of at least two of the plurality of candidate mobility service providers.

19. The non-transitory computer-readable storage medium of claim 17, wherein the mobility service data further includes at least one of:
a pricing model;
a number of shared vehicles;
a distribution of the number of shared vehicles over time;
historical booking event data;
shared vehicle availability data;
public transport system data; and
one or more service provider-imposed constraints.

* * * * *